United States Patent [19]
Payne

[11] Patent Number: 6,139,663
[45] Date of Patent: Oct. 31, 2000

[54] STRUCTURE FORMING METHOD, APPARATUS AND PRODUCT

[76] Inventor: LeRoy Payne, 3300 Nicholas La., Molt, Mont. 59057

[21] Appl. No.: 09/155,830

[22] Filed: Sep. 28, 1998

Related U.S. Application Data

[63] Continuation-in-part of application No. PCT/US96/05132, May 20, 1996, which is a continuation-in-part of application No. PCT/US95/05450, May 4, 1995, which is a continuation-in-part of application No. 08/239,540, May 9, 1994, Pat. No. 5,496,434, which is a continuation-in-part of application No. 07/870,927, Apr. 20, 1992, Pat. No. 5,330,603, which is a continuation-in-part of application No. 07/753,344, Aug. 30, 1991, Pat. No. 5,145,282, which is a continuation-in-part of application No. 07/521,442, May 10, 1990, Pat. No. 5,049,006, which is a continuation-in-part of application No. 07/417,501, Oct. 5, 1989, Pat. No. 4,955,760, which is a continuation-in-part of application No. 07/235,205, Aug. 23, 1988, Pat. No. 4,873,784.

[51] Int. Cl.[7] .......................... B32B 31/06; B32B 31/08; B32B 31/12; E01C 23/03; E02B 3/12
[52] U.S. Cl. ........................... 156/71; 156/276; 156/242; 156/500; 156/538; 156/547; 156/550; 366/15; 405/270
[58] Field of Search ................ 156/71, 276, 242, 156/500, 538, 547, 550; 366/15; 405/270

[56] References Cited

U.S. PATENT DOCUMENTS

| | | | |
|---|---|---|---|
| 1,986,871 | 1/1935 | Withee | 366/15 |
| 4,004,782 | 1/1977 | Jeppsen | 366/15 |
| 4,872,784 | 10/1989 | Payne | 405/270 |
| 4,955,759 | 9/1990 | Payne | 405/270 |
| 5,421,677 | 6/1995 | Adam et al. | 405/270 |

*Primary Examiner*—Jeff H. Aftergut
*Attorney, Agent, or Firm*—Arthur L. Urban

[57] ABSTRACT

A method of and apparatus for forming a continuous structure includes the steps of preselecting a liquid reactive resin forming material, a particulate solid additive material and a porous blanket, mixing and encapsulating the additive particles with the liquid resin forming material while tumbling the materials along a cylindrical mixing chamber. The leading edge of the structure is grasped with a gripping device along its entire length and advanced over a horizontal supporting surface. Once a desired length has been formed a cutting device cuts the structure and the cut portion is placed into a final configuration while flexible and adhesive.

20 Claims, 1 Drawing Sheet

U.S. Patent      Oct. 31, 2000      6,139,663
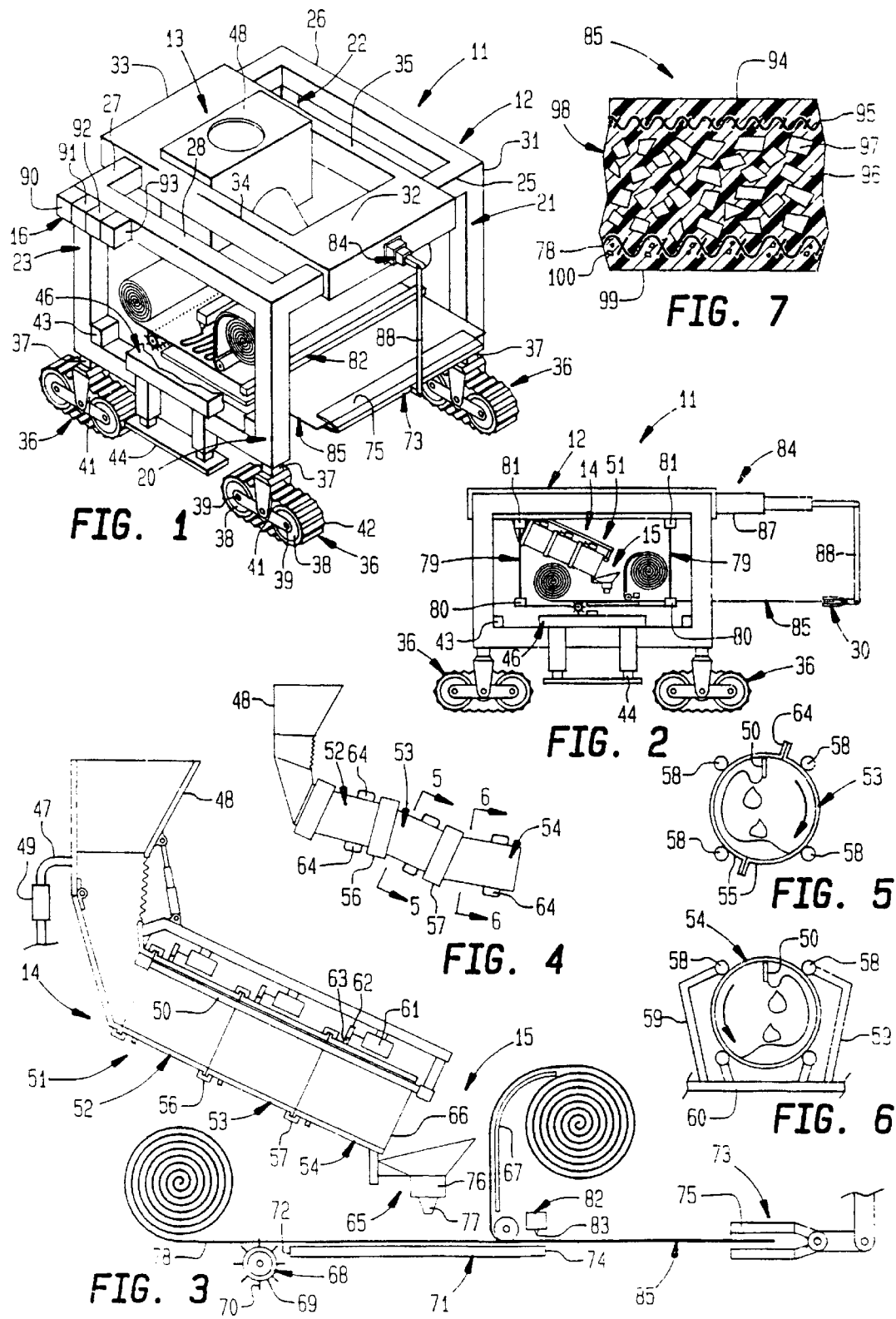

STRUCTURE FORMING METHOD, APPARATUS AND PRODUCT

This application is a continuation-in-part of International application No. PCT/US96/05132, filed May 20, 1996, which in turn is a continuation-in-part of International application No. PCT/US95/05450, filed May 4, 1995, which in turn is a continuation-in part of application Ser. No 08/239,540, filed May 9, 1994, now U.S. Pat. No. 5,496,434, which in turn is a continuation-in-part of application Ser. No. 07/870,927, filed Apr. 20, 1992, now U.S. Pat. No. 5,330,603, which in turn is a continuation-in-part of application Ser. No. 07/753,344, filed Aug. 30, 1991, now U.S. Pat. No. 5,145,282, which in turn is a continuation-in-part of application Ser. No. 07/521,442, filed May 10, 1990, now U.S. Pat. No. 5,049,006, which in turn is a continuation-in-part of application Ser. No. 07/417,501, filed Oct. 5, 1989, now U.S. Pat. No. 4,955,760, which in turn is a continuation-in-part of application Ser. No. 07/235,205, filed Aug. 23, 1988, now U.S. Pat. No. 4,872,784.

This invention relates to a novel continuous structure forming method and apparatus and to a new continuous structure produced thereby.

The present invention provides a novel method, apparatus and structure which overcome the shortcomings of previous expedients. In addition, the method, apparatus and structure provide features and advantages not found in earlier technology.

The method and apparatus of the present invention may be employed by individuals with only limited mechanical skills and experience. Structures can be produced by such individuals safely and efficiently without supervision utilizing the method and apparatus of the invention. The configuration and composition of the structure can be changed easily.

The method of the invention can be modified to form a variety of different structures with the apparatus of the invention.

Variations in physical dimensions, composition and surface appearance, etc. can be achieved. Even with such changes, uniform high quality can be maintained without difficulty with the method and apparatus of the present invention.

A novel method of the present invention for forming a continuous structure includes the steps of preselecting a liquid reactive resin forming material, a particulate solid additive material and a porous blanket. The additive particles are mixed with the liquid resin forming material substantially continuously while tumbling the materials along a generally cylindrical path in a preselected orientation. The direction of the tumbling is reversed as the materials advance along the cylindrical path. Substantially all of the additive particles are encapsulated with the resin forming material to a preselected thickness.

A pool of the resulting mixture is formed on the porous blanket while it is disposed in a preselected orientation. Part of the liquid resin forming material is migrated through the blanket substantially uniformly prior to gelling of the liquid resin forming material to form a continuous resin matrix within the structure.

A leading edge of the structure is grasped and advanced over a generally horizontally oriented supporting surface. The leading edge of the structure then is grasped along substantially its entire length and advanced away from the supporting surface along a preselected path. The structure is cut into a preselected length and the length placed into a final configuration while the length is flexible and adhesive.

The additive particles advantageously are mixed with the liquid resin forming material as they advance continuously downwardly along a cylindrical path through an elongated mixing chamber. The orientation thereof may be changed along preselected sections of the cylindrical path. The orientation of the mixing sections preferably is monitored and adjusted to maintain it within preselected specifications.

Materials may be added sequentially along preselected sections of the cylindrical path. This is especially useful with multiple component resin forming systems.

Advantageously, the mixture is deposited on the blanket in a reciprocating motion from one side to the other. A pool of the mixture preferably is confined in contact with the blanket, advantageously by introducing a second blanket such as a fibrous sheet and confining the pool of the mixture between the two blankets. In this way, both blankets become integral components of the structure.

If desired, pressure may be applied to the structure after its placement in a final configuration. Advantageously, a continuous film such as a polyethylene sheet is applied over the structure before applying pressure thereto. The pressure preferably is applied simultaneously across an entire width of the structure. A preselected pattern may be formed on a surface of the structure while pressure is applied thereto.

Benefits and advantages of the novel method, apparatus and structure of the present invention will be apparent from the following description of the accompanying drawings in which:

FIG. 1 is a view in perspective of one form of mobile continuous structure forming apparatus of the present invention;

FIG. 2 is a side view of the structure forming apparatus of the invention shown in FIG. 1;

FIG. 3 is an enlarged fragmentary side view in section of the structure forming apparatus of the invention shown in FIGS. 1 and 2;

FIG. 4 is a schematic illustration of another form of a mixing portion of the structure forming apparatus of the invention;

FIGS. 5 and 6 are fragmentary cross sectional views taken along lines 5—5 and 6—6 respectively of FIG. 4; and FIG. 7 is a further enlarged fragmentary cross sectional view of the structure of the invention shown in FIG. 1.

As shown in the drawings, one form of novel mobile continuous structure forming apparatus 11 of the present invention includes a supporting portion 12, a raw material supplying portion 13, a mixing portion 14, a matrix forming portion 15 and a control portion 16.

The supporting portion 12 of the structure forming apparatus of the invention includes a plurality of spaced upstanding frame members 20, 21, 22, 23. The frame members are adjustable in length. A plurality of generally horizontally disposed frame sections 25, 26, 27, 28 join adjacent upper ends of the upstanding frame members. For example, as shown in the drawings, frame section 25 extends between an upper end 30 of frame member 20 and an upper end 31 of frame member 21.

Opposed frame sections 25, 27 are of adjustable length. This may be accomplished as shown by dividing a frame section into two and partially overlapping adjacent free ends within a housing 32, 33.

Spaced support sections 34, 35 extend between opposed frame sections 25, 27 and particularly between the respective housing 32 or 33 of each opposed frame section. Mixing portion 14 and matrix forming portion 15 extend downwardly adjustably from the support sections between the upstanding frame members 20–23. Other components (not shown) such as an operator's seat, an electrical generator, an air compressor, a hydraulic pump and the like also can be mounted on and/or suspended from the frame sections and support sections.

Pivotable carriage means 36 extend downwardly from lower ends 37 of the upstanding frame members. Advantageously, the carriage means include wheels 38 rotatable on axles 39. The carriages preferably include variable drive means 41 and include endless track members 42. Drive means 43 advantageously adjust the length of frame members 20–23 and adjustable frame sections 25, 27.

The mobile structure forming apparatus 11 advantageously includes four spaced upstanding frame members and four frame sections forming a quadrangular assembly as shown in the drawings. Preferably, the apparatus 11 includes jack means 44 extending downwardly between the carriage means 36.

The raw material supplying portion 13 of the apparatus 11 includes a plurality of reservoirs 46 operatively connected with the supporting portion 12. The reservoirs are connected independently with the mixing portion 14 through flexible conduit means 47 (FIG. 3). The raw material supplying portion advantageously also includes a gravity feed hopper 48 adjacent the mixing portion 14 and preferably heating means 49 along the length of the flexible conduit means.

The mixing portion 14 of the structure forming apparatus 11 of the invention includes an elongated mixing chamber 51 adjustably disposed between the support sections 34, 35. The mixing chamber 51 includes a plurality of adjacent axially aligned rotatable mixing sections 52, 53, 54. Advantageously, the orientation of each mixing section is adjustable with respect to that of adjacent mixing sections as shown in FIG. 4.

Although the internal surfaces of the mixing sections usually are smooth, it may be desirable to utilize roughened surfaces, inwardly extending protrusions, e.g. blades, vanes, and the like. With such constructions, it is preferred that means be provided to clean the surfaces periodically. For example, blades or vanes can be retractable to remove any materials adhering thereto. Also, the mixing sections advantageously may be constructed with separable housings 55 including connecting flanges 64 (FIGS. 4 and 5).

The mixing sections 52–54 are operatively connected with slip members 56, 57. The sections of the mixing chamber are supported on spaced rollers 58 mounted on the ends of arm members 59 which extend upwardly from a base section 60 (FIG. 6). Base section 60 in turn is adjustably suspended from support sections 34, 35.

The mixing portion 14 includes independent drive means for each mixing section 52–54. As shown in the drawings, each drive means includes a motor 61 with a sprocket 62 engaging a ring gear 63 either directly or through a chain.

The matrix forming portion 15 of the apparatus 11 includes mixture distributing means 65 adjacent an outlet 66 of the mixing chamber 51. The mixture delivery means 65 may include an elongated transversely disposed arcuate member 67 with a generally horizontal lower edge.

A first elongated structure grasping means 68 is disposed adjacent the outlet 66 of the mixing chamber 51. Advantageously, as shown, grasping means 68 includes a rotatable rod 69 with outwardly extending projections or pins 70. When an arcuate member 67 is present, rod 69 is spaced below the lower edge thereof and aligned therewith.

Generally horizontally oriented structure support means 71 has one end 72 adjacent the rod 69. Second elongated structure grasping means 73 is disposed adjacent an opposite end 74 of the structure support means 71 remote from the first structure grasping means 68. Preferably, the second grasping means 73 as shown includes a pair of elongated hinged sections 75 aligned with rod 69.

Advantageously, the mixture distributing means 65 includes actuating means 76 reciprocating a delivery port 77 across the width of a blanket 78 passing thereunder. The mixture distributing means 65 preferably also includes positioning means 79, advantageously including sensing means 80 and actuating means 81. Preferably, cutting means 82 with a blade 83 is included, particularly cutting means extending parallel to and adjacent the opposite end 74 of the support means 71.

The mixture distributing means also advantageously includes advancing means 84 for moving structure 85 along a preselected path while the structure is flexible and adhesive. Advancing means 84 as shown in the drawings preferably may include a telescoping arm assembly 87 with a cable 88 to which second grasping means 73 is attached.

If desired, pressure applying means such as a roller, belt or opposed combinations thereof (not shown) may be included. The roller, belt, etc. may have a patterning surface. Pressure may be applied to the structure to conform it to an underlying surface, to compress the structure into a more dense mass and the like.

To form a structure employing the method and apparatus of the invention as shown in the drawings, a liquid reactive resin forming material is advanced from a reservoir 46 through a conduit 47 into mixing chamber 51. Simultaneously, other minor ingredients e.g. colors, catalysts, etc. from another reservoir advance through a conduit into the mixing chamber. At the same time, a particulate solid additive material from hopper 48 enters into the rotating mixing chamber 51.

The additive particles are mixed with the liquid resin forming material substantially continuously, preferably in a proportion significantly greater than that of the resin forming material. During this mixing operation, substantially all of the additive particles are encapsulated with the liquid resin forming material to a preselected thickness.

As the solid and liquid materials advance from one mixing section 52–54 to next along the mixing chamber, the mixing of the materials can be influenced by changing the operating parameters within each respective section. For example, the speed of rotation and/or the inclination of a particular section can be changed and also the direction of rotation can be reversed.

FIGS. 5 and 6 illustrate the position of the materials at different points along the mixing chamber. FIG. 5 shows the materials within mixing section 53 being rotated in a clockwise direction and FIG. 6 within section 54 in a counterclockwise direction. In the rotation of each section, as the materials reach a stationary wiper blade 50, the materials are separated from the inner surface of the mixing section and tumble to the bottom of the section. The partially mixed materials traveling upward again into contact with the blade are separated from the inner surface and tumble to the bottom of the section.

The resulting mixture being delivered from outlet 66 of the mixing chamber 51 passes downwardly through port 77 onto blanket 78. Advantageously, the treated blanket is advanced at a rate sufficient to form a continuous ribbon thereon as the port is reciprocated between the edges of the blanket 78.

Part of the liquid resin forming material is allowed to migrate through the blanket as it is advanced by first grasping means 68 onto horizontally oriented structure support 71. Migration of liquid resin forming material may continue during this step and succeeding steps as the leading edge of the resulting structure 85 reaches the opposite edge 74 of the structure support and is grasped by second grasping means 73. The second grasping means 73 shown as including a pair of hinged sections 75 operatively connected to telescoping arm assembly 87 through cable 88 draws the structure 85 along a preselected path.

When a desired preselected length of the structure 85 has reached the far edge 74 of the structure support 71, cutting means 82 is activated causing blade 83 to move across the structure from one side to the other. The cut length is carried by telescoping arm assembly 87 to an adjacent preselected location and positioned into a final configuration such as a path or ditch while the structure is flexible and adhesive. Pressure then is applied with a roller to conform the structure with the surface and into close contact therewith so that upon curing, the structure is permanently bonded thereto.

To produce high quality structures of the invention, it is important that all of the steps be carefully coordinated by control portion 16. The control portion 16 of the structure forming apparatus 11 of the invention includes programmable memory means 90 and actuating means 91 responsive thereto in combination with coordinating means 92 to control the operation of pumps, valves and drives. Preferably, the coordinating means includes a process controller 93 that initiates changes in the flows of materials and speeds of drives to bring variations therein back to the rates specified in the programs present in the memory 90.

This coordination commonly is achieved through the transmission of information such as digital pulses from monitors and/or sensors at the control components to the process controller 93. The operating information is compared with the preselected programming parameters stored in the memory 90. If differences are detected, instructions from the controller change the operation of the components to restore the various operations to the preselected processing specifications.

During the above steps, sensors 80 of positioning means 79 also are sensing the orientation of the mixing sections 52–54. If a deviation is detected in the specifications stored in memory 90, actuating means 91 automatically is energized to return the mixing sections to their preselected orientation.

As shown in FIG. 7, a cross section of a typical structure 85 of the invention includes a thin continuous resin rich upper layer 94 over a thin fibrous sheet 95 under which is a central layer 96 including a plurality of encapsulated solid particles 97 e.g. gravel, particles from grinding discarded tires, etc. within a continuous resin matrix 98. The resin matrix extends throughout the structure from the thin resin rich upper layer 94 through fibrous sheet 95, through particle rich central layer 96 downwardly through blanket 78 and into a thinner resin rich lower layer 99 including a few very small solid particles 100 disposed primarily closely adjacent to the blanket.

Advantageously, inclusion of outer upper and/or lower plastic films (not shown) may facilitate the installation of novel structures of the invention under adverse weather conditions or below water or other liquids. Also, the flowing of resin through film openings can provide adhesion of the structure to a subsurface (not shown).

Normal maneuvering of the continuous structure forming apparatus of the invention to maintain it centered over a ditch ordinarily can be accomplished by increasing the speed of the carriages 36 on one side and/or decreasing the speed of the carriages on the other side. Major transverse changes of direction may be accomplished by pivoting the carriages 36 ninety degrees from the normal operating orientation as shown in FIG. 1 using jacks 44 to raise the carriages off the ground. The apparatus then is moved sideways into a desired position at which point, the jacks 44 again raise the carriages 36 so they can be pivoted back to an orientation parallel to its original position.

The same steps can be employed to move the apparatus around obstacles such as bridges, trees, head gates, etc. To change the width of the apparatus, the two carriages on one side can be pivoted and driven away from or toward the center of the apparatus and thereby lengthen or shorten the adjustable frame sections 25 and 27.

The liquid reactive resin forming material employed to produce structures of the invention is selected to be capable of reaction to form the particular resin matrix desired in the final structure. Advantageously, the resin matrix is a thermosetting resin such as a polyurethane or polyester. Should a polyurethane be desired, one reservoir may contain an isocyanate and another reservoir may contain a polyol.

More commonly, the reservoirs may contain different partially formed materials which upon mixing interact to form the desired polyurethane. Examples of such partially formed materials include so-called "A stage" resins and "B stage" resins.

Other resin forming systems may utilize a resin forming material in one reservoir and a catalyst in a second reservoir. Additional components can be premixed with one of the resin formers, e.g. fillers, reinforcements, colors and the like.

The particulate solid additive material is mixed with the liquid reactive resin forming material substantially continuously, preferably in a proportion significantly greater than that of the resin forming material. The additive particles may be any of a wide variety of inexpensive materials readily available at a particular job site. Natural mineral particulate materials such as sand and gravel normally are available or can be produced simply by crushing rock at the site.

Also, materials such as waste or recycled materials which can be shredded or ground into particles of suitable size can be utilized. Particularly useful are particles formed by shredding or grinding discarded tires. Since the particles are encapsulated with the resin forming material and not saturated therewith, many different waste materials may be employed.

Suitable porous blankets include woven, knit, nonwoven structures, etc. The blankets e.g. fabrics, mats, etc. may be formed of continuous or discontinuous fibers, yarns, slit ribbons and similar natural and synthetic fibrous materials. Reinforcing members such as ropes, cables and the like that extend longitudinally and/or transversely of the blanket centerline may be included if desired.

The fibrous sheet includes products that utilize a major proportion of short fibers oriented predominately in a single plane. Preferably, the sheet is spot bonded at spaced points over its surface to provide strength along its major plane and general structural integrity.

The above description and the accompanying drawings show that the present invention provides a novel method, apparatus and structure which overcome the shortcomings of previous expedients and in addition, provide features and advantages not found in earlier technology.

The structure produced with the method and apparatus of the invention can include major proportions of recycled, waste or other materials which are readily available at a job site. These structures are of high quality and may exhibit properties not usually found in products formed with conventional ingredients.

The method of the invention may be conducted by individuals with only limited mechanical skills and experience to produce high quality structures safely and efficiently The method can be modified to form a variety of different structures. Variations in configuration, composition, physical dimensions and surface appearance, etc. can be achieved easily. Even with such changes, uniformity and high quality can be maintained without difficulty.

It will be apparent that various modifications can be made in the particular method, apparatus and structure described in detail above and shown in the drawings within the scope of the present invention. The method steps, apparatus components and types of materials employed can be changed to meet specific process and structural requirements. For example, the number and disposition of porous blankets and patterns can be different.

These and other changes can be made in the method, apparatus and structure of the invention provided the functioning and operation thereof are not adversely affected. Therefore, the scope of the present invention is to be limited only by the following claims.

What is claimed is:

1. A method of forming a continuous structure including the steps of preselecting a liquid reactive resin forming material, a particulate solid additive material and a porous blanket, mixing said additive particles with said liquid resin forming material substantially continuously while tumbling said materials along a cylindrical path in a preselected orientation, reversing the direction of said tumbling as said materials advance along said cylindrical path, encapsulating substantially all of said additive particles with said liquid resin forming material to a preselected thickness, advancing said blanket while migrating part of said liquid resin forming material through said blanket substantially uniformly prior to gelling of said liquid resin forming material to form a continuous resin matrix within said structure, grasping a leading edge of said structure, advancing said structure over a generally horizontally oriented supporting surface, grasping said leading edge of said structure along substantiallly its entire length, advancing said leading edge away from said supporting surface along a preselected path, cutting said structure into a preselected length, placing said preselected structure length into a final configuration while said length is flexible and adhesive.

2. A method of forming a continuous structure according to claim 1 including changing orientation along preselected sections of said cylindrical path.

3. A method of forming a continuous structure according to claim 1 including adding materials along preselected sections of said cylindrical path.

4. A method of forming a continuous structure according to claim 1 including the step of introducing a second blanket and confining a pool of said mixture between said two blankets.

5. A method of forming a continuous structure according to claim 2 wherein orientation of said mixing sections is monitored and adjusted to maintain said sections within preselected specifications.

6. A method of forming a continuous structure according to claim 1 including the step of applying pressure to said structure after it is positioned in a final configuration.

7. A method of forming a continuous structure according to claim 6 including applying a continuous film over said structure before applying pressure thereto.

8. Mobile continuous structure forming apparatus including a supporting portion, a raw material supplying portion, a mixing portion, a matrix forming portion and a control portion; said supporting portion including a plurality of spaced upstanding frame members of adjustable length, a plurality of generally horizontally disposed frame sections joining adjacent upper ends of said upstanding frame members, one pair of opposed frame sections being of adjustable length, support sections extending between said adjustable opposed pair of said frame sections, pivotable carriage means extending downwardly from lower ends of said upstanding frame members; said raw material supplying portion including a plurality of reservoirs operatively connected with said supporting portion, said reservoirs being connected independently with said mixing portion through flexible conduit means; said mixing portion extending from said support sections between said spaced upstanding frame members, said mixing portion including an elongated mixing chamber adjustably disposed between said support sections, said mixing chamber including a plurality of adjacent axially aligned rotatable mixing sections, independent drive means rotating each of said mixing sections about a central axis; said matrix forming portion including mixture distributing means extending adjustably downwardly from said support sections and being disposed adjacent an outlet of said mixing chamber, first elongated structure grasping means disposed adjacent said mixing chamber outlet and spaced therefrom, generally horizontally oriented structure support means having one edge adjacent said first structure grasping means, second elongated structure grasping means disposed adjacent an opposite edge of said structure support means remote from said first structure grasping means; said control portion including programmable memory means, coordinating means, sensing means, actuating means, and circuitry transmitting signals from said sensing means to said coordinating means for comparison with said memory means and activation of said actuating means to form and place a continuous structure into a final configuration while it is flexible and adhesive.

9. Mobile continuous structure forming apparatus according to claim 8 wherein said mixing portion is pivotable with respect to said supporting portion.

10. Mobile continuous structure forming apparatus according to claim 8 including positioning means adjusting the orientation of each mixing section with respect to adjacent mixing sections.

11. Mobile continuous structure forming apparatus according to claim 10 wherein said positioning means includes sensing means and actuating means.

12. Mobile continuous structure forming apparatus according to claim 8 wherein said mixing sections are operatively connected with slip members.

13. Mobile continuous structure forming apparatus according to claim 8 including means for advancing said structure along a preselected path while said structure is flexible and adhesive.

14. Mobile continuous structure forming apparatus according to claim 8 including cutting means associated with said mixture distributing means.

15. Mobile continuous structure forming apparatus according to claim 14 wherein said cutting means extends along said opposite edge of said structure support means.

16. Mobile continuous structure forming apparatus according to claim 13 wherein said means for advancing said structure along a preselected path includes an extendable arm assembly.

17. Mobile continuous structure forming apparatus according to claim 16 wherein said arm assembly extends from said supporting portion.

18. Mobile continuous structure forming apparatus according to claim 8 wherein said first elongated structure grasping means includes a rod member with outwardly extending pins.

19. Mobile continuous structure forming apparatus according to claim 8 wherein said second elongated structure grasping means includes a pair of hinged sections.

20. Mobile continuous structure forming apparatus according to claim 8 including four spaced upstanding frame members and four generally horizontally disposed frame sections forming a quadrangular assembly.

* * * * *